Patented Nov. 2, 1937

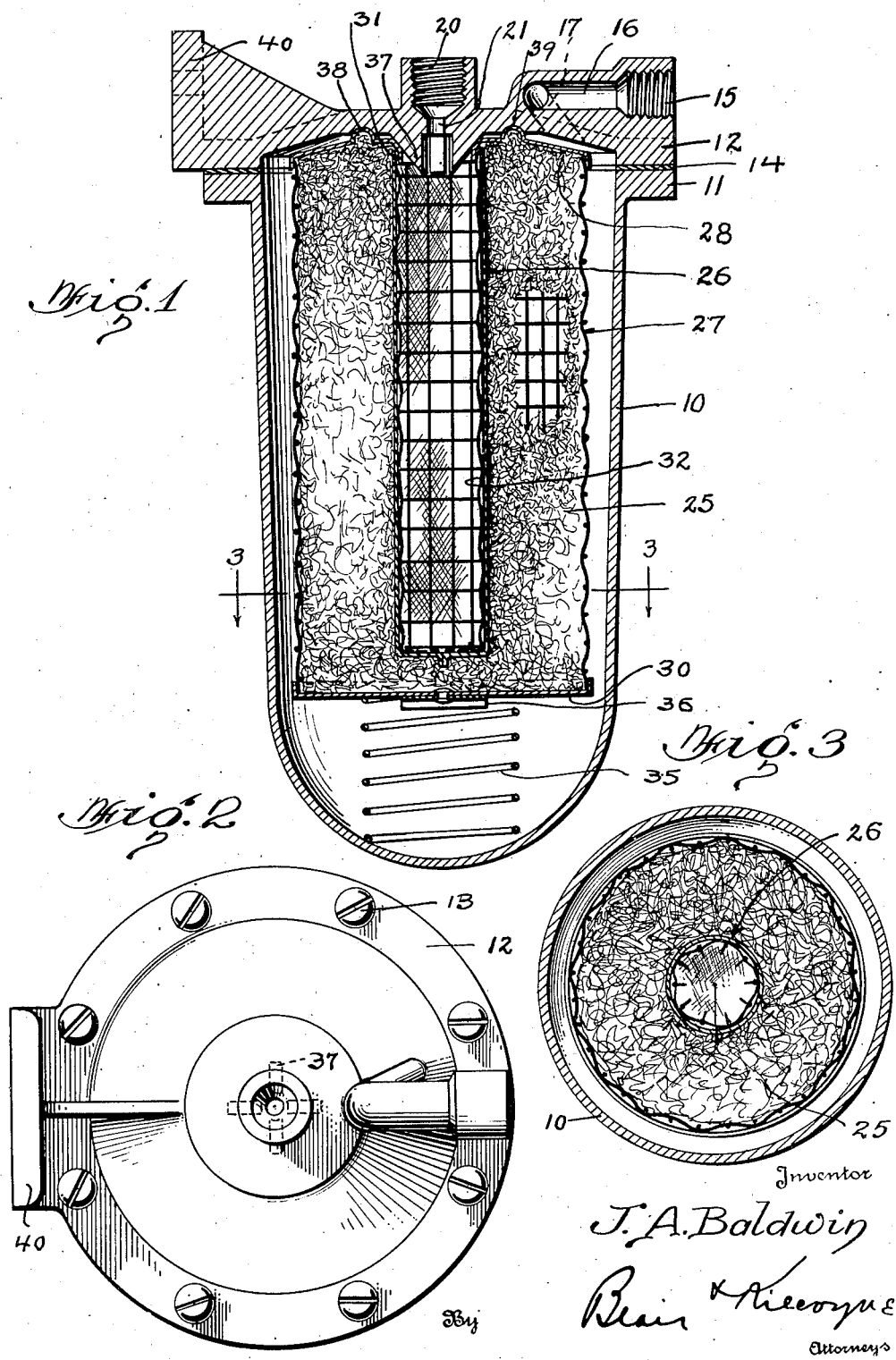

2,097,828

UNITED STATES PATENT OFFICE 2,097,828

OIL FILTER

Jesse A. Baldwin, Spooner, Wis.

Application October 15, 1936, Serial No. 105,818

5 Claims. (Cl. 210—131)

This invention relates to improvements in filters, and more particularly to oil filters of the character adapted to be connected in the line through which oil or equivalent lubricant under pressure is supplied to parts to be lubricated, for the purpose of separating out and collecting the impurities contained in the oil.

Among the objects of the present invention may be noted the provision of an oil filter of the stated character, which is characterized by improved features of design, which is relatively inexpensive in construction, which may be readily installed in the oil line, and which is rugged and durable in use; the provision of an oil filter in which separation of heavier impurities and/or sludge is effected prior to oil reaching the filter element per se; the provision of an oil filter embodying an inexpensive yet improved and efficient filter element; the provision of an oil filter which may be readily disassembled for cleaning, and/or replacement of the filter element and thereupon reassembled with equal facility.

Other objects will be in part obvious and in part hereinafter pointed out in connection with the following analysis of this invention wherein is illustrated an embodiment of the invention in detail.

In the drawing—

Fig. 1 is a vertical transverse section through an oil filter in accordance with the present invention;

Fig. 2 is a plan view of the filter illustrated in Fig. 1; and

Fig. 3 is a section along lines 3—3 of Fig. 1.

Referring to the drawing, reference character 10 designates a filter casing which is generally bowl-shaped and has its relatively upper open end provided with a horizontal top flange 11. A head 12 is secured to the casing 10 as by holding screws 13 passing through the head and threaded into the casing flange 11. Between the head and the casing flange 11 is arranged a gasket 14 thus to provide a leak-tight joint therebetween.

The head 12 on its upper face is provided with a thickened portion which extends radially, such portion being bored to provide a threaded opening 15, into which is threaded the oil inlet line (not shown), and opening to a horizontal bore portion 16 which may be of smaller diameter and which communicates with an inclined inlet port 17. The bore portions 15, 16 and 17 thus constitute an inlet passage through the head by which oil to be filtered may enter the casing 10.

As will be seen by reference to Fig. 1, the bore portion or port 17 is inclined downwardly to the axis of the bore portion 16, such inclination being of the order of 45°, and, by reference to Fig. 2, is further inclined laterally of the axis of the bore portion 16 by about 45°. Thus oil delivered through port 17 is deflected downwardly and relatively outwardly and, by reason of the lateral inclination of the aforesaid port, is directed toward the inner wall surface of the casing 10 at a forwarding angle, as will be hereinafter more fully described.

The head is also provided with a preferably central outlet passage formed by a threaded opening 20 into which the oil outlet line (not shown) from the filter is connected, the passage 20 communicating with a smaller diameter bore 21 opening into the casing.

Arranged within the casing in the path of the oil flow between the inlet and outlet passages aforesaid is a filter element, such including an annular mass 25 of relatively coarse filtering material, such as cotton waste, arranged about a tube or sleeve 26 of relatively fine filtering material, such as wool felt. The mass of cotton fibers is arranged within an outer cylindrical screen element 27 of relatively coarse mesh, suitably secured to and maintained in cylindrical formation as by an upper cap 28 and a lower cap 30. Carried by an annular flange 31 of the cap 28 and extending within the cylindrical screen 27 is an inner cylindrical screen element 32, also of coarse mesh, and being of substantially lesser diameter than the outer screen element 27 and terminating above the bottom cap 30, as aforesaid. The tube of wool felt is disposed about and carried by the inner screen element 32, the cotton waste material being thereupon arranged between the inner surface of the screen element 27 and the outer surface of the felt tube or sleeve 26.

The filter element as aforesaid constitutes a unit which is yieldingly supported in the casing 10 as by a coil spring 35 acting between the bottom of the casing and the bottom cap 30 of the filtering device, a clip 36 being provided to secure the spring 35 to such cap 30. Spring 35 thus bodily urges the filter element upwardly and against the head 12 which carries about the central outlet opening 21 thereof a plurality of symmetrically disposed, inclined guide lugs 37 which cooperate with an inclined portion of the top cap 28. This arrangement insures that the filtering device is properly centered in the casing.

The top cap 28 is further provided with an upstanding annular bead 38 which seats in an annular channel 39 formed on the under surface of the head, thus to provide a seal between the filter element and the head and insuring passage of oil through the filter element prior to its discharge through the outlet passages 20 and 21.

As will be seen from the Fig. 1 construction, top cap 28 of the filtering element is slightly sloped and extends beyond the opening of the inclined bore 17. The arrangement of parts is such that oil entering the casing through the port 17 strikes the upper surface of the sloped cap 28 and is directed relatively outwardly. By reason of the lateral inclination of the inlet port 17, the oil is further directed at an angle of approximately 45° against the inner surface of the container 10, such flow components giving to the oil a swirling motion which causes the heavier impure particles as contained in the oil to be separated therefrom, whereupon such heavier particles drop to the lower end of the casing for subsequent removal.

As oil is forced into the casing 10, it passes through the annular mass of cotton waste, which separates out the sludge and the relatively coarse impurities still remaining in the oil. The relatively clean oil then passes through the fine filtering material of the tube 26 which, by reason of its closely knit and interfelted texture, functions to separate out and collect the relatively fine impurities remaining in the oil. Hence, oil passing through the wool felt tube 26 for delivery through the outlet passage is substantially clean.

An oil filter as aforesaid may be readily connected into an oil line from a source of supply to parts to be lubricated, it being desirable to secure the filter to a fixed support. For this purpose the head 12 is provided with an upstanding and preferably integral bracket extension 40, which may be provided with securing bolt or screw openings whereby the head 12 and the casing secured thereto may be suitably supported.

When it is desired to clean the filter or to replace the filter element, the casing 10 may be disconnected from the head 12 by unthreading the screws 13, whereupon the casing 10 and filter element therein may be lowered from the head for cleaning or the casing and/or replacement of the filter element. It will be understood that such disconnection of the casing from the head does not disturb the securement of the head to the fixed support as described. Upon cleaning of the casing and/or the filter element, or upon substitution of a new filter element, the parts may be quickly and readily reassembled as aforesaid.

As many changes could be made in carrying out the above construction without departing from the scope of the invention, it is intended that all matter contained in the above description or shown in the accompanying drawing shall be interpreted as illustrative and not in a limiting sense.

I claim:—

1. A filter comprising a casing having one end open; a removable head closing said casing having an inlet and a central, vertically disposed outlet, and an annular channel located between said inlet and outlet; a filter element including a top cap member having a central opening in communication with the outlet and a circular bead to engage in said channel, inner and outer screens operatively related to the top cap member, and filtering material located between the inner and outer screens; cooperating means on said head and cap member operative to center the filter element with respect to the head and casing; and spring means arranged between the casing and the filter element and operative, in conjunction with the centering means, to maintain the filter element centered and yieldingly to maintain the bead of the top cap member seated in the channel.

2. A filter comprising a casing having one end open; a removable head closing said casing having an inlet and a central, vertically disposed outlet, and an annular channel located between said inlet and outlet; a filter element including a top cap member having a central opening in communication with the outlet and a circular bead to engage in said channel, inner and outer screens operatively related to the top cap member, and filtering material located between the inner and outer screens; guide means on said head for engagement by said top cap member; and spring means arranged between the casing and the filter element and operative, in conjunction with the guide means, to maintain the filter element centered and yieldingly to maintain the bead of the top cap member seated in the head channel.

3. A filter comprising a casing having one end open; a removable head closing said casing having an inlet and a central, vertically disposed outlet, and an annular channel located between said inlet and outlet; a filter element including a top cap member having a central opening in communication with the outlet, the cap member having an inclined surface disposed about said central opening and a circular bead to engage in said channel, inner and outer screens operatively related to the top cap member, and filtering medium located between the inner and outer screens; inclined guides carried by said head adapted to be engaged by the inclined surface of the top cap member, whereby to center the filter element with respect to the head and casing; and spring means arranged between the casing and the filter element and operative yieldingly to maintain the filter element centered and the bead of the cap member seated in the head channel.

4. A filter comprising a casing having one end open; a removable head closing said casing having an inlet and a central, vertically disposed outlet, and an annular channel located between said inlet and outlet; a filter element including top and bottom cap members, the top cap member having a central opening in communication with the outlet and a circular bead to engage in said channel, an outer screen extending between the cap members, an inner screen dependingly carried by the top cap member and arranged about the central opening thereof, the inner screen having a covering of felted material, and a mass of unfelted fibrous material arranged between the inner screen covering and the outer screen; cooperating means on said head and cap member operative to center the filter element with respect to the head and casing; and spring means arranged between the casing and the filter element and operative, in conjunction with the centering means, to center the filter element and yieldingly to maintain the bead of the top cap member seated in the head channel.

5. A filter comprising a casing having one end open; a removable head closing said casing having an inlet and a central, vertically disposed outlet, and an annular channel located between said inlet and outlet; a filter element including top and bottom cap members, the top member having a central opening in communication with the outlet and a circular bead to engage in said channel, an outer screen extending between the cap members, an inner screen dependingly carried by the top cap member and arranged about the central opening thereof, a tube of felt material covering the inner screen, and a mass of cotton waste disposed between the inner screen covering and the outer screen; cooperating means on said head and cap member operative to center the filter element with respect to the head and casing; and spring means arranged between the casing and the filter element, and operative yieldingly to maintain the filter element centered and the bead of the top cap member seated in the head channel.

JESSE A. BALDWIN.